(12) United States Patent
Badent et al.

(10) Patent No.: US 12,233,497 B2
(45) Date of Patent: Feb. 25, 2025

(54) JOINING TOOL AND TOOL GRIPPER

(71) Applicants: TOX PRESSOTECHNIK GMBH & CO. KG, Weingarten (DE); ALPHA LASER GMBH, Puchheim (DE)

(72) Inventors: Michael Badent, Weingarten (DE); Wolfgang Pfeiffer, Hagnau am Bodensee (DE); Juergen Sollner, Waldburg (DE)

(73) Assignees: TOX PRESSOTECHNIK GMBH & CO. KG, Weingarten (DE); ALPHA LASER GMBH, Puchheim (DE)

( * ) Notice: Subject to any disclaimer, the term of this patent is extended or adjusted under 35 U.S.C. 154(b) by 0 days.

(21) Appl. No.: 18/436,276

(22) Filed: Feb. 8, 2024

(65) Prior Publication Data
US 2024/0238922 A1 Jul. 18, 2024

Related U.S. Application Data

(63) Continuation of application No. PCT/EP2022/065974, filed on Jun. 13, 2022.

(30) Foreign Application Priority Data

Aug. 13, 2021 (DE) ...................... 10 2021 121 086.0

(51) Int. Cl.
*B23P 19/06* (2006.01)
*B21J 15/02* (2006.01)
(Continued)

(52) U.S. Cl.
CPC ........... *B23P 19/062* (2013.01); *B21J 15/025* (2013.01); *B21J 15/08* (2013.01); *B23K 26/22* (2013.01)

(58) Field of Classification Search
CPC ......... B23K 26/22; B21J 15/025; B21J 15/08; B21J 15/10; B21J 15/28; B23P 19/062;
(Continued)

(56) References Cited

U.S. PATENT DOCUMENTS 9,114,477 B2 * 8/2015 Haschke ............ B23K 26/1464
2003/0167621 A1 9/2003 Wang et al.
(Continued)

FOREIGN PATENT DOCUMENTS

CN 205599858 U 9/2016
DE 10 2018 202 140 A1 8/2019
(Continued)

OTHER PUBLICATIONS

German Search Report (Application No. 10 2021 121 086.0) dated Apr. 4, 2022 (8 pages).
(Continued)

*Primary Examiner* — Dana Ross
*Assistant Examiner* — James F Sims, III

(57) ABSTRACT

A joining tool unit including a hold-down device with a movable tool and a tool counter element. The hold-down device together with the movable tool and the tool counter element are provided opposite each other. A workpiece can be positioned between the hold-down device and the tool counter element in the arranged state. The movable tool and the tool counter element interact in order to form a joint connection. A light-guiding system is formed on the hold-down device, to conduct a light beam in the direction of a joint location of the workpiece when the workpiece is arranged on the joining tool unit. A flow channel for a fluid is defined along a section of the light beam up to a workpiece-side end of the hold-down device.

12 Claims, 4 Drawing Sheets

(51) Int. Cl.
  *B21J 15/08*    (2006.01)
  *B23K 26/22*    (2006.01)
(58) Field of Classification Search
  CPC ....... B23P 19/04; B21D 37/16; B21D 39/031;
  B21K 25/00
  USPC .................................................. 219/121.63
  See application file for complete search history.

(56) References Cited

U.S. PATENT DOCUMENTS

2018/0250734 A1   9/2018  Savoy et al.
2018/0264597 A1*  9/2018  Yamagishi ......... B23K 26/0626
2021/0178457 A1   6/2021  Savoy et al.

FOREIGN PATENT DOCUMENTS

DE    10 2018 107 662 A1   10/2019
WO        2018/160959 A1    9/2018

OTHER PUBLICATIONS

International Search Report and Written Opinion (Application No. PCT/EP2022/065974) dated Sep. 23, 2022 (16 pages).
International Preliminary Report on Patentability (with Chapter II Claims) (Application No. PCT/EP2022/065974) dated Dec. 12, 2023 (with English translation) (30 pages).

* cited by examiner

JOINING TOOL AND TOOL GRIPPER

CROSS REFERENCE TO RELATED APPLICATIONS

This application is a continuation of International Application No. PCT/EP2022/065974 filed Jun. 13, 2022, which designated the United States, and claims the benefit under 35 USC § 119(a)-(d) of German Application No. 10 2021 121 086.0 filed Aug. 13, 2021, the entireties of which are incorporated herein by reference.

FIELD OF THE INVENTION

The present invention relates to a joining tool and tool gripper.

BACKGROUND OF THE INVENTION

Joining tool units, in which a tool of the joining tool unit, in particular, a punch or die, are checked for damage by means of a medium, are already known. Joining tool units which have a light guiding system are also known, wherein the light guiding system is designed to conduct a light beam of a light in the direction of a joint location of the workpiece. Thus it is advantageously possible to join workpieces which have a high degree of hardness.

In the case of hitherto known joining tool units it is a drawback that, due to the use of lasers, protection against radiation has to be ensured for the operators who work with the joining tool unit or who may remain in the area of operation of the joining tool. In the known joining tool unit, the complete joining tool unit is provided to this end with a housing which is configured to be light-proof relative to the light of the laser beam. As a result, the known joining tool unit is of a relatively expensive and complex design, in particular, for automated processes.

SUMMARY OF THE INVENTION

The object of the present invention is to provide an improved joining tool unit. In particular, the object of the present invention is to provide an improved joining tool unit, a joint location being able to be safely generated thereby on a hard workpiece.

The present invention is based on a joining tool unit comprising a hold-down device with a movable tool and a tool counter element, wherein the hold-down device together with the movable tool and the tool counter element are provided opposite each other, wherein a workpiece can be positioned between the hold-down device and the tool counter element in the arranged state, wherein the movable tool and the tool counter element cooperate to form a joint connection, wherein a light guiding system is formed on the hold-down device, wherein the light guiding system is designed to conduct a light beam of a light in the direction of a joint location of the workpiece when the workpiece is arranged on the joining tool unit.

For example, a workpiece comprises two or more workpiece parts which are arranged in layers or positioned on top of one another, for example. Advantageously, it is possible to arrange two or more workpiece parts, which are connected together by the joining tool unit in a joining process by means of a joint connection, between the movable tool and the tool counter element. The workpiece parts which are arranged between the movable tool and the tool counter element can be configured from different materials. For example, the workpiece parts can have different metal compositions or different hardnesses. Preferably, the workpiece part against which the movable tool bears during a joining process is harder and/or more brittle than the further workpiece part. It is conceivable that the workpiece consists of exactly one workpiece part. For example, in a joining process a functional element is placed on the workpiece by the joining tool unit. For example, in a joining process a functional element is placed on a single workpiece part or exactly one workpiece part.

For example, the joining tool unit is configured such that the workpiece part, on which the movable tool acts, can be heated by a light. Due to the possibility of heating the workpiece to be joined, it is advantageously possible to produce by means of the joining tool unit a joint connection between a hard and/or brittle workpiece part and a workpiece part made of a softer material. Due to the possibility of heating the workpiece to be joined, the joining tool unit can also implement an improvement relative to connection applications which are already possible or known today.

The joining tool unit is advantageously configured for placing a functional element, for example, for placing a self-piercing nut, a rivet nut, a press-in nut, a bolt, a screw element, on the workpiece and/or for clinching and/or for placing a rivet such as, for example, a clinching rivet, a solid punch rivet or a semi-hollow punch rivet. A functional element can be riveted, pressed, punched or clinched, for example, into the workpiece by the joining tool unit.

By means of the joining tool unit, for example, a plurality of workpiece parts can be connected together, for example, with a connecting element such as a rivet, or without a connecting element, for example, by a clinching process. By means of the joining tool unit it is possible to place the functional element on a workpiece which consists, for example, of exactly one workpiece part.

At least during the joining process, the hold-down device is preferably in contact with the relevant surface of the workpiece. Generally, the surface of the workpiece in contact with the hold-down device is advantageously configured to be planar and flat. For example, a side of the hold-down device facing the tool counter element, such as a front face of the hold-down device which comes to bear against the workpiece when the workpiece is arranged, is also designed to be planar and flat. The front face of the hold-down device preferably consists of a mechanically comparatively resistant or deformation-resistant material, such as, for example, a hard metal or a high carbon steel material.

The hold-down device can also have a stripper function. For example, after the production of the joint connection is completed, the movable tool is moved away from the workpiece relative to the tool counter element. It is conceivable here that the workpiece remains adhered to the movable tool, wherein the hold-down device in this case advantageously remains in its position in contact with the workpiece relative to the tool counter element, so that the workpiece remains fixed in position and thus is stripped by the movable tool, due to its state clamped between the hold-down device and the tool counter element.

It is also conceivable that both the movable tool and the tool counter element perform at the same time a movement away from the workpiece or toward the workpiece. Advantageously, in this case the workpiece is positioned by a separate holding element between the movable tool and the tool counter element.

The hold-down device can alternatively be configured to serve solely as a beam shield and/or solely to conduct the light beam. The light beam is preferably generated by a light source, wherein, for example, the light source is configured as a laser, in particular, as a solid-state, gas or liquid laser. It is conceivable that the laser can be operated in a pulsed laser mode and/or in a continuous laser mode. Furthermore, the light of the light beam can also be in the visible UV range and/or IR range. Advantageously, a wavelength of the light source is adapted to a maximum absorption of the material of the workpiece to be treated, so that an input of heat into the workpiece which is as efficient as possible in terms of energy is implemented by the light of the light source.

For example, the moveable tool is provided to be movable along a movement axis of the joining tool unit. For example, the movable tool is provided to be movable only in a linear manner along the movement axis of the joining tool unit. Preferably, in the arranged state of a workpiece on the joining tool unit, the joining tool unit is configured to join the workpiece by a movement of the movable tool in the direction of the tool counter element. In particular, a maximum speed of movement of the movable tool relative to the tool counter element is between 0.1 m/s and 2 m/s, for example between 1 m/s and 2 m/s.

For the movement of the movable tool and/or the hold-down device, for example, a drive is provided, for example, a linear drive, such as, for example, a pneumo-hydraulic, hydraulic, pneumatic and/or electric drive unit. Preferably, the drive for the movable tool and/or the hold-down device comprises an electromechanical servo drive.

The movable tool is configured, for example, as a die unit or as a punch unit. Furthermore, the tool counter element is configured, for example, as a die unit or as a punch unit.

For example, a punch unit which comprises the hold-down device and the movable tool is provided. For example, the hold-down device is configured as a punch hold-down device and the movable tool is configured as a punch tool. For example, the tool counter element is provided as a die.

It is also conceivable that a die unit which comprises the hold-down device and the movable tool is provided. For example, the hold-down device is configured as a die hold-down device and the movable tool is configured as a die. For example, the tool counter element is provided as a punch tool. In both of the aforementioned cases the hold-down device is configured to provide a hold-down function and/or stripper function.

It is conceivable that the movable tool is configured as a punch tool and the tool counter element is configured as a die, or vice versa. It is also conceivable that the joining tool unit has two movable tools, wherein the movable tools are provided opposite each other on the joining tool unit. Preferably, the two movable tools are provided to be movable in a linear manner. For example, the tool counter element comprises a movable tool. It is further conceivable that a joining tool unit has two hold-down devices with in each case a movable tool, wherein, for example, one movable tool is a punch tool and one movable tool is a die, wherein the two hold-down devices are arranged with the movable tool opposite each other on the joining tool unit.

Furthermore, for example, a light guiding system can be arranged in each case on the two hold-down devices, wherein, for example, only one hold-down device has a movable tool and the other hold-down device has a tool counter element. Furthermore, for example, both hold-down devices can also have in each case a movable tool and a light guiding system. For example, it is possible to irradiate and thus to heat both workpiece sides. For example, it is possible to predetermine a mutual adaptation of the two light beams which strike the workpiece or a first workpiece side and a second workpiece side. For example, it is possible to pre-determine this via the control unit, i.e. it is possible, for example, to predetermine a start of the irradiation, an end of the irradiation, or a duration of the respective or simultaneous irradiation on both sides and/or a quantity of energy or intensity of the two light beams.

Advantageously, a workpiece can be subjected to the light beam from a first side, from a second side or from two sides by the two light guiding systems. When irradiated from two sides, advantageously a corresponding quantity of energy or intensity which is desired or which is possible in a shorter time relative to single light irradiation can be effectively supplied to the workpiece. In two-sided irradiation, it is also possible to heat two superimposed workpiece parts, which are arranged between the two hold-down devices, by the light guiding systems.

It has also proved advantageous that the hold-down device and the tool counter element are provided to be movable relative to one another. As a result, the joining tool unit can be used in a comparatively flexible manner.

For example, the hold-down device is provided to be movable relative to the tool counter element. For example, the hold-down device and the movable tool are provided to be movable independently of one another by means of the drive. The hold-down device is preferably movable in the direction of the tool counter element by means of the drive. It is conceivable that the hold-down device and the tool counter element are provided to be movable relative to one another by means of the drive. For example, the drive can move the hold-down device and/or the tool counter element. The hold-down device advantageously encloses the movable tool circumferentially over a longitudinal extent of the movable tool. Preferably, a bore is provided for the movable tool in the hold-down device, wherein the movable tool is movable in a linear manner along the bore in the hold-down device.

Advantageously, the hold-down device and the tool counter element can be moved toward one another so that it is possible to clamp a workpiece arranged between the hold-down device and the tool counter element. For example, firstly a workpiece can be fixed thereby for a joining process, and secondly workpiece parts of the workpiece can also be clamped against one another thereby, so that a heat transfer from one workpiece part to another workpiece part of the workpiece is improved.

For example, the hold-down device, the light guiding system and/or the light source are arranged relative to one another or against one another such that the hold-down device, the light guiding system and/or the light source are provided only to be movable together. For example, the hold-down device, the light guiding system and/or the light source are provided to be fixed in position relative to one another.

For example, the light guiding system encloses the light of the light source along a light beam of the light, so that the light is shielded in a lightproof manner by the light guiding system outwardly in the radial direction to the light beam. The light guiding system is preferably designed in the hold-down device such that the light guiding system encloses the light along the light beam, so that the light is shielded by the light guiding system outwardly in the radial direction to the light beam.

In practice, even under the best conditions in practice, small components of the light beam are produced as scattered light in the state of the hold-down device positioned on the workpiece. This is because generally the portions of the hold-down device and the portions of the surface of the workpiece are not able to bear absolutely flat against one another, or the hold-down device cannot be positioned exactly perpendicularly to the workpiece surface. Thus in practice gap regions with a small gap width, for example, in the tenths of a millimeter range, are generally produced between the surface of the hold-down device or the front face of the hold-down device and the workpiece surface in the arranged state on the workpiece. Components of the scattered light can emerge through a gap between the hold-down device or the front face thereof and the surface of the workpiece outwardly into the surroundings of the joining tool unit. The gap can be present, for example, due to unevenness such as, in particular, selective depressions or elevations of the two opposing surfaces on the hold-down device and the workpiece and/or from a non-parallel orientation of the opposing surfaces, for example, between the front face of the hold-down device and the workpiece surface.

It is also proposed that the hold-down device is configured such that, in the arranged state of a workpiece on the joining tool unit, the hold-down device is arranged in position in contact with the surface of the workpiece such that the hold-down device encloses the joint location of the workpiece, so that a maximum of 20% of the radiant power of the light between the hold-down device and surface of the workpiece is radiated outwardly or so that a maximum of 20% of the radiant power of the incident light in the immediate surroundings of the point of the workpiece to be joined is radiated outwardly between the hold-down device and the surface of the workpiece.

For example, the radiant power of the light is to be regarded as the radiant power of the light of the light source which acts on a workpiece arranged on the joining tool unit. For example, the radiant power of the light emerging directly at the light source is greater than the radiant power of the light which acts on a workpiece arranged on the joining tool unit, in particular, due to reflection and absorption losses of the light on its path from the light source to the joint location.

Preferably, a recess of the light guiding system is provided in the hold-down device. Preferably, the recess of the light guiding system, in particular, a cylindrical recess, is provided inside the hold-down device and is preferably fully closed circumferentially relative to a light guide axis, wherein the light can be conducted in the direction of the workpiece along the cylinder axis of the recess, for example, the longitudinal extent of the recess. For example, the recess is provided as a bore, for example, as a through-bore on the hold-down device. The recess is surrounded, for example, by the material of the hold-down device which extends to the recess. It is also conceivable that the recess is provided in the manner of a tube, for example, as a tube on the hold-down device. It is, however, also conceivable that the light guiding system has a glass fiber and the glass fiber is fixed to the hold-down device.

For example, a flow channel for a fluid is defined along a section of the light beam of the light to a workpiece-side end of the hold-down device, wherein the flow channel has an inlet and a first outlet, wherein the first outlet for the fluid is formed on a workpiece-side end of the hold-down device, the outlet being in contact with the workpiece during a joining process, and wherein a second outlet of the flow channel is provided.

Advantageously, the light guiding system is provided on the hold-down device such that a light beam of the light of the light source exclusively radiates onto the joint location at an angle of greater than 0° relative to a movement axis of the movable tool. Preferably, the angle of incidence is as steep as possible relative to the movement axis of the linearly movable tool. Preferably, the light guiding system is designed such that the light beam of the light radiates exclusively in an angular range of between 5° to 40° relative to the movement axis of the linearly movable tool onto the joint location of the workpiece. Advantageously, a longitudinal axis of the recess, in particular, a first recess, is provided in an angular range of between 5° and 40° relative to the movement axis of the movable tool on the hold-down device.

The slight oblique orientation of the light beam toward or onto the joint location on the workpiece advantageously permits a relatively slim design of the hold-down device, in particular, in its front end portion facing the tool counter element. Thus preferably virtually no change is made to an external dimension of the hold-down device, which is advantageous for the arrangement and accessibility of the joining tool unit on the workpiece or the joint location to be treated by the movable tool, for example.

Setting means are conceivable for setting the angular range, whereby the light beam can be set relative to the movement axis of the linearly moveable tool. The setting angle which can be set by the setting mechanism is preferably defined by the design of the recess.

Furthermore, advantageously a second recess is provided on the hold-down device. It is conceivable that the second recess is provided mirror-symmetrically to the first recess on the hold-down device. Preferably, the mirror axis runs parallel to the movement axis of the movable tool. If the movement axis of the movable tool runs centrally through the hold-down device or the movable tool, for example, preferably the movement axis corresponds to the mirror axis.

The recesses are preferably configured on the hold-down device such that the light is conducted along the first recess onto the workpiece when the joining tool unit bears against the workpiece and the light reflected from the workpiece is conducted along the second recess. Due to the guidance of the light beam along the first and the second recesses in the hold-down device, a protective cabin can be dispensed with.

For example, the hold-down device comprises a radiation trap or a radiation sump in which the reflected light is captured and absorbed. Preferably, the radiation trap or the radiation sump is located at the end of the second recess. The end of the second recess is preferably configured in the opposing direction to the workpiece.

Advantageously, a practical use of the joining tool unit is possible by means of the proposed light guiding system. In particular, the joining tool unit can advantageously be used without significant additional measures, which, for example, relates to safety aspects regarding a potential for danger due to the high amount of light energy.

For example, the hold-down device comprises a depression. For example, the depression is located opposite the tool counter element so that in the arranged state of a workpiece on the joining tool unit, and when the hold-down device is in contact with the workpiece, the depression is located in the region around the joint location of the workpiece.

Preferably, the first and the second recess in each case transition into the depression at one end. For example, during the joining process the movable tool engages in the depression or through the depression. The depression is preferably provided as a bore on the hold-down device.

For example, the hold-down device is provided such that the hold-down device encloses the depression so that in an ideal case, in the state in contact with the workpiece, the hold-down device together with the workpiece fully enclose the depression.

Preferably, an indentation is provided in addition to the second recess, wherein the indentation starts on a portion of the second recess and runs to an end of the indentation. A longitudinal extent of the indentation preferably runs parallel to the movement axis of the movable tool. The indentation is preferably configured cylindrically.

The light guiding system starts, for example, directly downstream of the light source of the light beam and ends at the second recess or at the radiation trap or radiation sump. The flow channel of the fluid preferably runs along the light guiding system and ends in a direction, for example, on a collimator, or, for example, a single lens or, for example, a ground fiber end. For example, the collimator or the single lens or the ground fiber end is preferably arranged downstream of the light source of the light beam, so that the light of the light source is influenced. The flow channel preferably also comprises the indentation so that the fluid can pass both into the second recess and into the indentation.

The fluid which is in the flow channel is preferably a gas, such as, for example, nitrogen or air. Advantageously, it is possible to use nitrogen since this has no particles or liquids, such as, for example, water. Air can also be used in addition to nitrogen, wherein the air preferably does not contain particles and liquids. The fluid is preferably introduced in the inlet into the light guiding system or the flow channel. The inlet is preferably arranged upstream of the first recess and downstream of the collimator or the lens or the fiber end on the flow channel. Preferably, a connection for a fluid supply is provided at the inlet, such as, for example, for a nitrogen gas bottle.

The first outlet is preferably configured at the workpiece-side end of the hold-down device, wherein the first recess ends at the first outlet and the second recess starts at the first outlet. The outlet is preferably a part of the depression of the hold-down device. Preferably, the first outlet bears against the workpiece when a joint connection is produced, wherein the movable tool preferably comes into contact with the workpiece at the first outlet. The first outlet is preferably designed to be slightly wider than the width of the movable tool. The width of the movable tool is, for example, configured perpendicularly to the movement axis of the movable tool.

The second outlet is preferably arranged at the end of the indentation. The second outlet is preferably an opening in the hold-down device, wherein the fluid can flow out of the opening in the flow channel. Furthermore, disruptive solids or liquids can be removed from the flow channel by the fluid, since the fluid can entrain these solids or liquids. In particular, solids are disruptive for the light guiding system or the optics in the light guiding system. The second outlet can also be connected to a pump, for example, so that the fluid can be actively removed from the flow channel.

It is advantageous that a sensor is arranged on the flow channel.

Preferably, the sensor is configured as a pressure sensor and/or as a flow sensor. The sensor is arranged, for example, on the indentation, preferably in the vicinity of the second outlet. The sensor can, however, be configured at any point of the flow channel. Furthermore, a plurality of sensors can be arranged in the flow channel so that the pressure can be measured at different points of the flow channel.

It is advantageous if a change in pressure can be measured by the sensor.

Preferably, the pressure changes as a function of whether the joining tool unit or the hold-down device is positioned on the workpiece. Advantageously, the pressure in the flow channel is higher when the first outlet is covered, in particular, is completely covered, by the workpiece since otherwise the fluid can flow through the first outlet out of the hold-down device.

Preferably, the first outlet is permanently covered by the workpiece during the production of the joint connection. Preferably, the production of the joint connection starts when the hold-down device bears against the workpiece, in particular, when the first outlet is covered by the workpiece. The contact between the hold-down device and the workpiece is preferably able to be influenced by predetermining a force, wherein the force is a pressing force or compressive force which acts between the hold-down device and the surface of the workpiece. To this end, for example, a mechanical spring is provided, such as, for example, a helical compression spring or a pneumatic spring which pushes axially onto the hold-down device relative to the movement axis of the movable tool or pretensions this hold-down device in the direction of the tool counter element.

The hold-down device is preferably moved away from the workpiece only after the joint connection is produced. Preferably both the irradiation of the workpiece and the movement of the movable tool in the direction of the workpiece for forming a joint connection, and the movement of the movable tool back into an initial position, take place while the hold-down device bears against the workpiece or pushes onto the workpiece. The movement of the movable tool in the direction of the tool counter element can be started, and simultaneously or subsequently an irradiation or illumination of the joint location with the light can be terminated. As a result, advantageously it is possible to implement a relatively short joining cycle time. The irradiation of the workpiece can also be terminated before the movable tool is moved in the direction of the workpiece.

It is also advantageous that the second outlet can be shut off.

The second outlet is preferably arranged at the end of the indentation, wherein the second outlet can be an opening toward the outer face of the hold-down device. The opening of the second outlet can be shut off or opened, for example, by a flap which can be mechanically operated.

A further possibility is that a line, for example, a gas line, is arranged on the opening. For example, a valve can be configured on the gas line, wherein the second outlet can be opened or closed by the valve.

It is also conceivable that a suction line is arranged on the second outlet, so that fluid can be actively removed from the flow channel. The suction line is preferably arranged directly adjacent to the inlet on the joining tool unit.

For example, a negative pressure prevails on the suction line. The negative pressure is provided, for example, by a negative pressure device, such as, for example, a pump, so that, for example, by switching the pump on or off the second outlet can be blocked or opened, or fluid is removed from the flow channel or remains in the flow channel. Pumps can be permanently operated, for example, in order to achieve a constant suction power, for example. For example, a valve is configured between the pump and the second outlet, wherein the second outlet can be blocked or opened by the valve.

Advantageously, the second outlet can be blocked or opened by the control unit. For example, the control unit can switch the flap, which can be mechanically operated, or the valve or the pump.

A flow can be generated in the flow channel when fluid flows in through the inlet and the second outlet is open. The opening of the second outlet can be opened only by the mechanical flap releasing the opening or the valve being open. Furthermore, the fluid can also be suctioned out of the open second outlet, for example, by the pump.

A flow in the flow channel is advantageously provided during the production of the joint connection. This means that the flow is formed in the flow channel during the irradiation of the workpiece and with the movement of the movable tool. Advantageously, a flow is formed even before the light source is activated, since contamination, such as, for example, disruptive particles and gases, can be removed thereby from the flow channel or from the light guiding system or from the optics of the light guiding system. Advantageously, a flow is provided in the flow channel after the light source is switched off so that dirt particles or gases which are released during the joining process, in particular, in the vicinity of the first outlet, can be transported away by the fluid or removed from the flow channel.

The second outlet can be closed again shortly after the joint connection is produced and the initial position of the movable tool is reached.

Advantageously, the light guiding system comprises optics, wherein the fluid can be conducted through the flow channel such that the fluid cools and cleans the optics.

The optics are preferably mirrors, lenses, protective glasses and the like.

Advantageously, a fluid flow runs along the flow channel so that contamination, such as, for example, dust particles or soot particles, can be removed from the flow channel with the fluid. Advantageously, the fluid flows from the inlet along the optics to the second outlet when the first outlet is covered by the workpiece. Preferably, an optics region of the light guiding system is separated by a protective glass from the recesses in the hold-down device. In the optics region, for example, the mirrors are arranged and advantageously the inlet is configured so that the particle-free fluid flows into the optics region. The fluid which is present in the optics region can flow along the protective glass only at the side and on the outer regions. As a result, the fluid in the optics region is advantageously built up when fluid is introduced into the optics region through the inlet. The pressure in the optics region is preferably the same or greater than the pressure in the recesses of the hold-down device. In order to protect the optics, advantageously fluid is permanently introduced into the optics region via the inlet, even when the joining tool unit is not in operation.

Advantageously, the quantity of fluid which flows into the flow channel through the inlet is regulated and/or controlled. Preferably, more fluid flows through the inlet into the flow channel when a flow is generated in the flow channel or when the first outlet is covered and the second outlet is open, than when the first outlet is open. For example, the same quantity of fluid flows into the flow channel as is suctioned off when a flow is generated in the flow channel.

Furthermore, heat which is produced by the light beam can be removed by the flow of fluid along the flow channel. A further option is that a cooled or cold fluid is introduced into the flow channel, and thereby the temperature in the flow channel or the optics can be further reduced. For example, additionally the radiation trap or the radiation sump can be cooled by the fluid.

Furthermore, the radiation trap or the radiation sump preferably has a cooling plate at the end of the second recess, wherein the cooling plate is arranged on an outer face of the hold-down device. The cooling plate preferably serves to dissipate the absorbed or captured heat energy of the radiation trap or the radiation sump. The cooling plate can be replaceably arranged on the hold-down device. Furthermore, it is conceivable that the radiation trap or the radiation sump is actively cooled, for example, by a liquid cooling system. For example, the radiation trap or the radiation sump is solely or additionally cooled by the gas flow or air flow conducted in the flow channel.

It is also advantageous that the joining tool unit comprises a control unit, wherein the control unit can detect the data of the sensor.

The control unit is preferably a programmable computing unit, wherein preferably the control unit can communicate with the sensor. The sensor preferably communicates to the control unit the pressure measured by the sensor.

The operation of the joining tool unit is preferably implemented by the control unit. Preferably, the control unit is configured to control and/or regulate the drive and/or the light source and/or a component of the light guiding system. Furthermore, the control unit is configured to move the hold-down device, for example, in particular, by the drive, in the direction of the tool counter element until the hold-down device is in contact with the workpiece arranged on the joining tool unit.

It is advantageous that a predetermined threshold value can be exceeded when the first outlet is covered and the second outlet is blocked.

For example, fluid is introduced through the inlet into the flow channel before the light beam is activated. For example, the first outlet is covered by the workpiece and the second outlet is blocked, so that a dynamic pressure is produced in the flow channel by the introduction of fluid. The threshold value can be exceeded by the dynamic pressure only when the hold-down device is positioned perpendicularly to a joining surface of the workpiece or when a maximum of 20% of the radiant power of the light radiates outwardly between the hold-down device and the surface of the workpiece.

It is also advantageous that the control unit activates the light beam when the sensor exceeds the predetermined threshold value for the pressure.

The threshold value is preferably stored in the control unit so that the control unit can compare the pressure measured by the sensor with the threshold value. The light beam can be activated only when the threshold value is exceeded, so that the workpiece can be heated by the light beam on the bearing surface of the first outlet on the workpiece. For example, the control unit checks whether a pressure detected by the sensor exceeds the threshold value before an irradiation of the joint location of the arranged workpiece with the light of the light source and/or before a movement of the movable tool is started. For example, the sensor is configured to determine whether the hold-down device is in a position in contact with the workpiece such that the hold-down device with the workpiece shields the light of the light source outwardly in a light-proof manner, so that a danger to an operator in the surrounding region of the joining tool unit can be eliminated.

It is also conceivable that the light power system has a shutter. For example, an illumination of a joint location by the light of the light source can be activated or deactivated by means of the shutter. For example, the shutter is provided as an optical closure, for example, in the form of a mechanical and/or electronic closure, for example, as a movable element. The movable element, which consists, for example, of a light-impermeable material, is, for example, able to be introduced into the path of the light beam, blocking this light beam, and moved out again. Advantageously, the shutter can be activated or the movable element can be actuated by means of the control unit.

Furthermore, the control unit of the joining tool unit is configured such that an irradiation of the joint location of the arranged workpiece with the light of the light source is terminated before the movable tool can enter into a light beam of the light of the light source during its movement in the direction of the tool counter element. For example, the control unit switches off an irradiation of the joint location of the workpiece shortly before the entry of the movable tool into the light beam of the light. As a result, heating of the movable tool and thus damage to the movable tool are prevented.

Advantageously, a cycle control of a joining process of the joining tool unit is comparatively simplified since, in particular, a central control unit which can control, regulate and/or drive the processes of the joining process is provided.

It is advantageous that the control unit deactivates or does not release the light beam when the sensor falls below a predetermined threshold value for the pressure.

If the pressure measured by the sensor is below the threshold value, the light beam is preferably deactivated by the control unit.

If the pressure measured by the sensor is below the threshold value, the joining tool unit blocks, in particular, the control unit blocks, a start of an irradiation of the joint location of the arranged workpiece with the light of the light source and/or a start of a movement of the movable tool. Thus it is not possible for the light beam to be accidentally or deliberately activated by a person when the joining tool unit is not correctly positioned on the workpiece or can radiate too much radiation outwardly.

An advantageous embodiment of the present invention is a tool gripper comprising a joining tool unit according to one of the above-described embodiments and comprising a tool clip.

Advantageously, the tool clip connects the movable tool to the tool counter element, so that a flux of force between the movable tool and the tool counter element is implemented. The tool clip is preferably a C-shaped clip which, for example, can be fastened to a robot arm. For example, the tool gripper is configured as clinching, riveting, joining and/or embossing tongs. It is also conceivable that the tool gripper is provided as semi-hollow punch rivet tongs and/or as solid punch rivet tongs.

A method in the form of a joining process of a workpiece by a joining tool unit is also proposed, wherein the method has the following method steps:

introducing a fluid into a flow channel,
moving the joining tool unit in the direction of a workpiece until a first outlet of a hold-down device is positioned on the workpiece,
blocking a second outlet of the hold-down device,
measuring a pressure by means of a sensor in the flow channel,
comparing the pressure measured by the sensor with a predeterminable threshold value for the pressure by means of a control unit,
opening the second outlet and producing a flow in the flow channel when the predetermined threshold value is exceeded by the pressure measured by the sensor,
activating a light source by means of the control unit,
terminating the irradiation of the joint location of the workpiece at the same time as the start of the movement of the movable tool of the joining tool unit in the direction of the workpiece, or after the start of the movement of the movable tool of the joining tool unit in the direction of the workpiece,
shutting off the second outlet by means of the control unit,
moving the joining tool unit or hold-down device away from the workpiece.

For example, the aforementioned method steps take place successively in the sequence set forth above. It is also conceivable that individual method steps take place superimposed or at the same time. For example, the introduction of the fluid takes place after the movement of the joining tool unit.

The fluid is introduced, for example, through the inlet into the flow channel over the entire joining process, wherein the fluid flows out of the first outlet as long as the hold-down device is not positioned on the workpiece. For example, in one method step the workpiece to be treated is arranged, for example, positioned, between the movable tool and the tool counter element on the joining tool unit. The positioning of the workpiece to be treated can be undertaken here by a positioning unit, for example, a robot arm, which is provided outside the joining tool unit. It is also conceivable that the positioning unit is a constituent part of the joining tool unit. Preferably, the workpiece to be treated bears against the tool counter element. The joining tool unit is moved toward the workpiece to be treated by means of the drive, until the first outlet of the hold-down device is positioned on the workpiece. After the hold-down device is positioned on the workpiece, the movable tool is moved by the drive in the direction of the workpiece so that the movable tool has to cover a shorter path to the workpiece when the workpiece to be treated has been heated by the light beam. A spring element is loaded by the movement of the movable tool, and a force is exerted thereby on the hold-down device in the direction of the workpiece. The first outlet is pushed against the workpiece by the force which acts on the hold-down device, so that when the light beam is switched on few beams, or virtually no beams, reflected from the workpiece can escape from the hold-down device.

In order to check the position of the hold-down device on the workpiece, the pressure is determined in the flow channel, and preferably the second outlet is closed to this end. As a result, the fluid builds up inside the flow channel when the first outlet on the hold-down device is covered by the workpiece and when the flow channel or the light guiding system is not damaged. The pressure measured by the sensor is communicated to the control unit, wherein the control unit preferably compares the pressure measured by the sensor with a predeterminable threshold value. The threshold value is preferably selected such that even with a narrow gap between the first outlet and the workpiece, the pressure measured by the sensor in the flow channel cannot exceed the threshold value. Thus it is ensured that the light source is able to be activated only with a desired, for example, perpendicular, positioning of the hold-down device on the workpiece.

For example, after the pressure in the flow channel has been checked, the second outlet is opened so that a flow is built up in the flow channel. Thus preferably contamination is removed from the flow channel by the flow in the flow channel.

Once the flow is formed in the flow channel, the control unit activates the light source so that the light beams strike the workpiece. For example, the workpiece is heated by the light beams of the light source, wherein a portion of the light beams are reflected on the workpiece, in particular, when the surface is not yet heated. The reflected light beams pass along the second recess to the radiation trap or radiation sump. As a result, protection against radiation is ensured without an additional radiation protection cabin.

The temperature on the workpiece is preferably measured by a pyrometer. The pyrometer is arranged on the hold-down device, wherein a bore is configured on the hold-down device. For example, the bore is provided on the hold-down device so as to be rotated relative to the first recess by 90° about the movement axis. As a result, a heat radiation of the workpiece can reach the pyrometer via the bore, whereby a temperature of the workpiece can be determined at the joint location of the workpiece. The pyrometer preferably communicates the measured temperature to the control unit, wherein the temperature to be reached is stored in the control unit and compared with the measured value. If the temperature to be reached, for example, is not attained before a specific time period, the light source is deactivated.

For example, a movement of the movable tool is started in the direction of the tool counter element, in particular, immediately before the light source is switched off or at the same time as the light source is switched off, so that the workpiece is joined at the joint location. For example, the control unit is configured to check whether the light source and thus an illumination of the workpiece is switched off when the movable tool reaches a region of the radiation path of the light beams of the light source on its path in the direction of the tool counter element. It is also conceivable, however, that the control unit initially checks whether the light source and thus an illumination of the workpiece is switched off, and activates a movement of the movable tool only after checking whether the light source is switched off. For example, during the production of the joint connection, in particular, a flow is permanently present in the flow channel so that contamination which is generated when producing the joint connection can be transported away.

For example, after the joining process is terminated, the movable tool is moved back into an initial position. For example, then the second outlet is closed. For example, then the joining tool unit is moved away from the workpiece. For example, fluid flows permanently through the inlet in the direction of the first outlet so that the optics are not contaminated, even during downtime.

BRIEF DESCRIPTION OF THE DRAWINGS

Further features and advantages of the invention are explained in more detail by way of an exemplary embodiment of the present invention which is shown schematically.

DETAILED DESCRIPTION OF THE INVENTION

Figure 1:
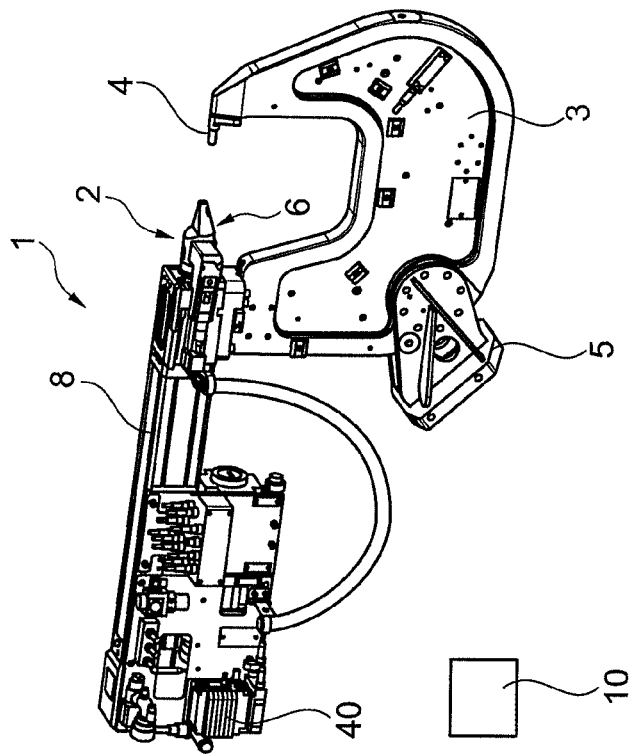
FIG. 1 shows a perspective view obliquely from above of a tool gripper with a joining tool unit.

A tool gripper 1 with a joining tool unit 2 is shown in FIG. 1. The tool gripper 1 has a tool clip 3, wherein the joining tool unit 2 or a tool counter element 4 of the joining tool unit 2 is arranged on the tool clip 3. The tool clip 3 is preferably designed as a C-shaped clip and can be fastened, for example, via a connecting element 5 to a robot arm, not shown in FIG. 1.

A hold-down device 6, a movable tool 7 (see FIG. 2), a drive 8, a light source 10 and a control unit 40 are arranged on the joining tool unit 2. For example, the light source 10 is configured as a laser, in particular, as a fiber laser. The drive 8 can be configured as an electrical, a pneumatic, a hydraulic or a hydropneumatic drive.

For example, the movable tool 7, a pyrometer 24 and a light guiding system 9 are arranged on the hold-down device 6. The light guiding system 9 comprises a collimator 11, a first mirror 12, a second mirror 13, a radiation trap 14 or radiation sump and a protective glass 15 (see FIG. 4). The collimator 11 is preferably designed such that a collimated light beam is generated, for example, a collimated laser light beam is generated. For example, the light beams of the light source 10 are widened and oriented at least approximately parallel to one another. The first mirror 12 is adjustable, for example, so that the position of a light beam of the light source 10 can be set to a workpiece 25 to be treated. The second mirror 13 is preferably arranged fixedly in position on the joining tool unit 2. The protective glass 15 preferably forms a separating point between the optics or the mirrors 12, 13 and the collimator 11 of the light guiding system 9 and the hold-down device 6. Furthermore, the beam diameter of the light beam can be set by an adjusting element 26 on the outer face of the joining tool unit 2. Preferably, a cooling plate 31 which cools the radiation trap 14 or the radiation sump is configured at the end of the radiation trap 14 or the radiation sump. The cooling plate 31 is preferably releasably arranged on an outer face of the hold-down device 6, and thus the cooling plate 31 can be replaced or cleaned, for example, in the case of wear or contamination.

Figure 2:
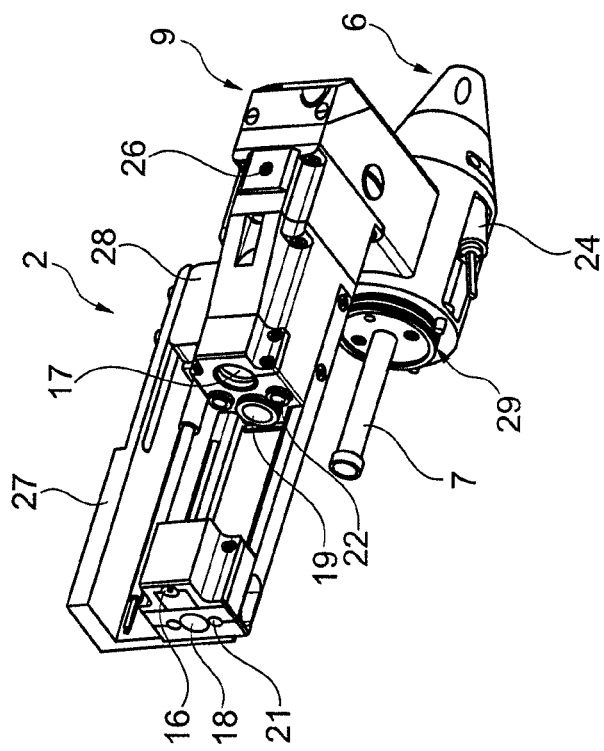
FIG. 2 shows a perspective view of a part of the joining tool unit.

The joining tool unit 2 preferably has sockets 16, 17 in order to couple the light source 10 to the joining tool unit 2 (see FIG. 2). For example, sockets 18, 19 for a suction line 20 and sockets 21, 22 for an inlet 23 are also provided on the joining tool unit so that a fluid can flow in or be suctioned off. For example, the fluid is configured as a gas, for example as air, in particular, as air cleaned of particles. For example, the fluid is present as a purified gas, free of particles. It is also conceivable that the fluid is present as a specific gas, such as, for example, nitrogen or carbon dioxide.

A standard tool gripper can be retrofitted with a part of the joining tool unit 2, in particular, with a hold-down device 6 and light guiding system 9, by the hold-down device 6 and the light guiding system 9 being connected to a drive 8 which is preferably arranged on a tool clip 3. Preferably, to this end the joining tool unit 2 has a fastening element 27, wherein a part of the joining tool unit 2, in particular, the part of the joining tool unit 2 on which the sockets 16, 17, 18, 19, 21, 22 are configured, can be connected by the fastening element 27 to the drive 8. Furthermore, the hold-down device 6 for the connection to the drive 8 has an attachment element 29. The fastening element 27 is preferably made from a plate-shaped material, in particular, metal. The fastening element 27 can be connected by fastening mechanism 30, for example, screws, to the drive 8. For example, a safety switch 28 is arranged on the fastening element 27.

A sectional view of a part of the joining tool unit is shown in FIGS. 4, 5, 6, 7 and 8, and the design of the light guiding system 9 or a flow channel 38 can be better illustrated thereby. A light beam of the light source 10 is coupled from the light source to the light guiding system 9 in the region 41. The path of the light beam is shown schematically in FIG. 4 by arrows L. The light beam passes, for example, from the light source 10, not shown in FIG. 4, to the region 41 and onward to the collimator 11, wherein the light beam, for example, is then reflected on the first mirror 12 and on the second mirror 13 and by way of example passes through the protective glass 15 to the hold-down device 6. A first recess 32 is configured on the hold-down device 6, wherein the first recess 32 is a bore in the hold-down device 6, for example. The light beam preferably passes through the first recess 32 to a first outlet 33 (see FIG. 4) which is configured on the workpiece-side end of the hold-down device 6. If the hold-down device 6 is positioned on a workpiece 25, the light beam is reflected on the preferably metal workpiece surface 42 and passes into a second recess 34 which is configured in the hold-down device 6, for example, as a bore. The radiation trap 14 or the radiation sump is configured at the end of the second recess 34, so that the light beams reflected from the workpiece 25 are received and absorbed in the radiation trap 14 or the radiation sump.

Preferably a depression is formed in the hold-down device 6 at the end of the first recess 32 and the start of the second recess 34, wherein the movable tool, for example, strikes the workpiece 25 through the depression on the first outlet 33. The depression is preferably provided as a bore in the hold-down device 6.

Further preferably, a bore for the movable tool 7 is provided in the hold-down device 6, so that the movable tool 7 can be moved in a linear manner along a movement axis 35 in the direction of the workpiece 25. The movement axis 35 preferably runs along a longitudinal extent of the movable tool 7. Furthermore, the movement axis 35 runs centrally through the movable tool 7, for example. A longitudinal axis of the first recess 32 or the second recess 34 is provided, for example, in an angular range $\alpha$ of between 5° to 40° relative to the movement axis 35 of the movable tool 7 on the hold-down device 6 (see FIG. 4). Preferably, the second recess 34 is designed mirror-symmetrically to the first recess 32, wherein, for example, the mirror plane runs through the movement axis 35 of the movable tool 7.

For example, parts of the light guiding system 9 form the flow channel 38. For example, the first and the second recess 32, 34 of the light guiding system 9 and the depression or the first outlet 33 form a part of the flow channel 38. Preferably, the flow channel 38 primarily runs along the light guiding system, wherein the flow channel 38 only starts downstream of the collimator 11. Furthermore, the flow channel 38 has an indentation 36 which is preferably configured as a bore. The indentation 36 preferably starts on a portion of the second recess 34 and runs parallel to the movement axis 35 of the movable tool 7. The fluid passes via the inlet 23 into the flow channel 38 and can flow along the flow channel 38. The fluid is preferably stored in the optics region downstream of the collimator 11 up to the protective glass 15, since the fluid can flow only on the outer faces of the protective glass 15 to the first recess 32. As a result, an overpressure is generated in the optics region downstream of the collimator 11 up to the protective glass 15, as long as the fluid flows in through the inlet 23. For example, fluid flows in permanently via the inlet 23 in order to keep the optics or the mirrors 12, 13 clean. The fluid can flow out of the flow channel 38 through the first outlet 33 and a second outlet 37. The second outlet 37 is preferably arranged at the end of the indentation 36, wherein the second outlet 37 is connected to the suction line 20, for example, so that the fluid flowing in can be suctioned off at the end of the indentation 36. Preferably, a suction line 20, from which the fluid can be suctioned off from the flow channel 38, is arranged on the flow channel 38.

The fluid is introduced over the entire joining process through the inlet 23 into the flow channel 32, wherein the fluid flows out of the first outlet 33, as long as the hold-down device 6 is not positioned on the workpiece 25. For a joining process, initially the joining tool unit 2 is preferably moved in the direction of the workpiece 25 to be treated until the hold-down device 6 and the tool counter element 4 bear against the workpiece. For example, in a joining process two workpiece parts are connected together. As soon as the hold-down device 6 is positioned on the workpiece 25, the drive 8 preferably moves the movable tool 7 along the movement axis 35 in the direction of the workpiece 25. This represents an initial position of the movable tool 7. Thus the spacing between the movable tool 7 and workpiece 25 is minimized, so that the movable tool 7 has a relatively short path to the workpiece 25.

When the movable tool 7 is moved by the drive 8, a spring element is preferably loaded, whereby the hold-down device 6 is pushed with a force of the spring element against the workpiece 25. As a result, the first outlet 33 of the hold-down device 6 is preferably fixedly pushed against the workpiece 25, which is intended to prevent light from exiting between the hold-down device 6 and workpiece 25. Furthermore, due to the high contact force of the hold-down device 6 on the workpiece 25, which bears against the hold-down device 6, heat can be transferred more effectively from a first workpiece part to the second workpiece part of the workpiece 25 which bears against the tool counter element 4.

For example, it is then checked whether the hold-down device 6 bears as desired against the surface of the workpiece 25 on which the movable tool 7 initially acts. To this end, the position of the movable tool 7 is preferably determined by the control unit 40. Since the movable tool 7 is connected to the drive 8, additionally the position of the hold-down device 6 and the light guiding system 9 is preferably checked via the safety switch 28. For example, after both tests deliver the desired results and have been identified as correct, the pressure within the flow channel 38 is determined.

Figure 4:
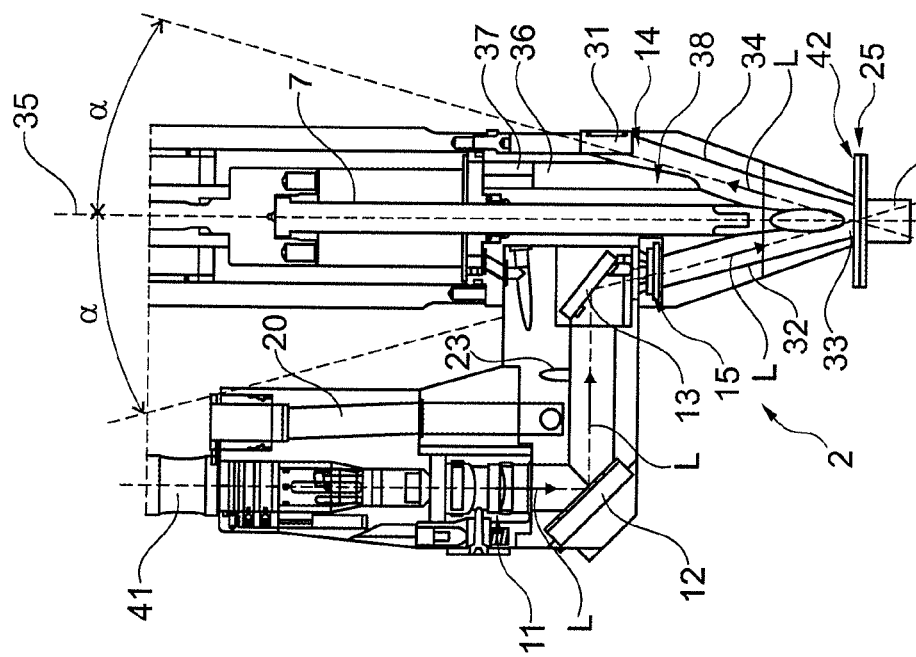
FIG. 4 shows a sectional view of a part of the joining tool unit according to FIG. 1, wherein the joining tool unit with the hold-down device and the tool counter element bear against a workpiece, and wherein a path of a light beam is indicated.
Figure 3:
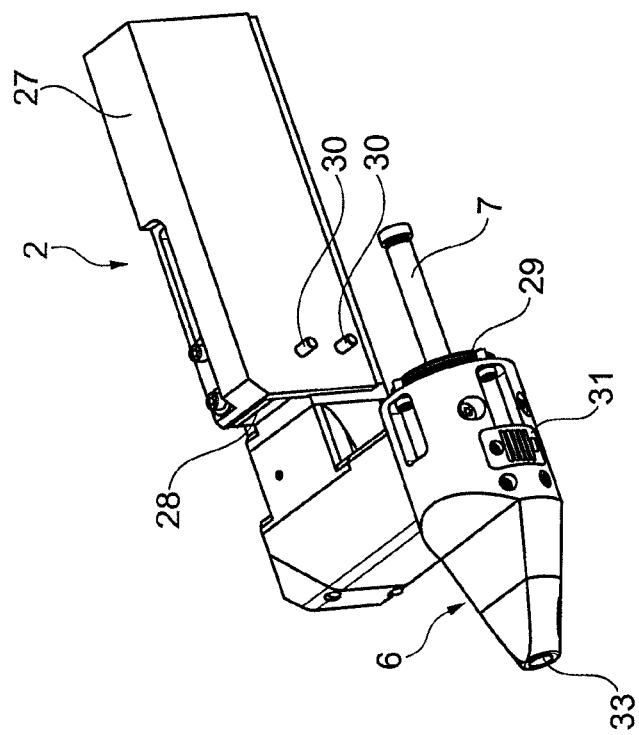
FIG. 3 shows a further perspective view of the part of the joining tool unit according to FIG. 2.

For determining the pressure, preferably the second outlet 37 or a valve to the pump on the suction line 20 is closed (see FIG. 4). As a result, the fluid builds up inside the flow channel 38 when the first outlet 33 on the hold-down device 6 is covered by the workpiece 25 and when the flow channel 38 or the light guiding system 9 is not damaged. The pressure in the flow channel 38 is advantageously measured by a sensor (not shown). The pressure measured by the sensor is communicated to the control unit 40, wherein the control unit 40 preferably compares the pressure measured by the sensor with a predeterminable threshold value (see FIG. 1). The threshold value is preferably selected such that even with a narrow gap between the first outlet 33 and workpiece 25, the pressure measured by the sensor in the flow channel 38 cannot exceed the threshold value. Thus it is ensured that the light source 10 can be activated only with a desired, for example, perpendicular, positioning of the hold-down device 6 on the workpiece 25, so that no light radiation or light radiation reflected from the workpiece 25 escapes outwardly.

Figure 5:
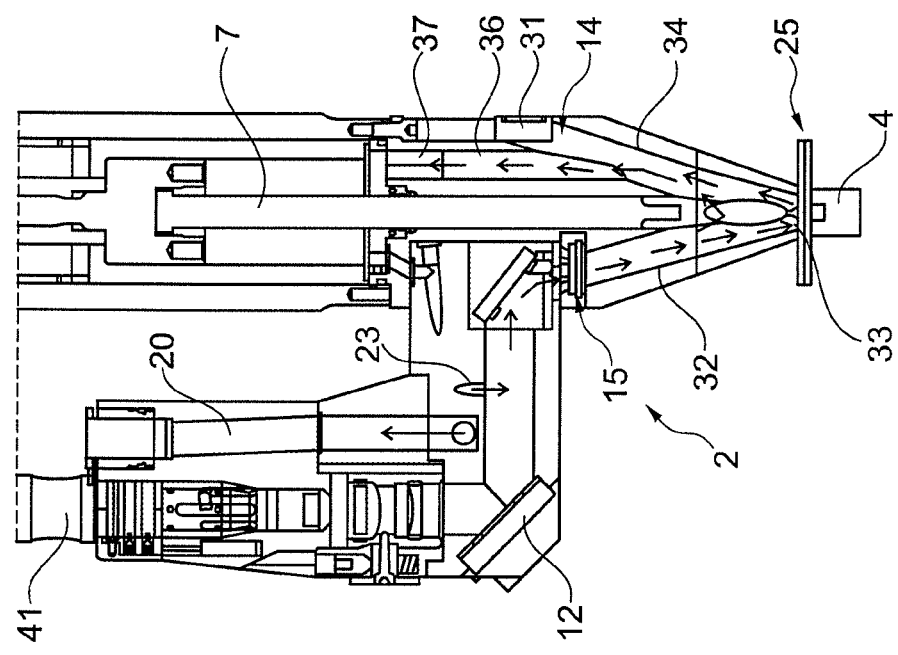
FIG. 5 shows a sectional view of the arrangement according to FIG. 4, wherein a path of a fluid flow is indicated.
Figure 8:
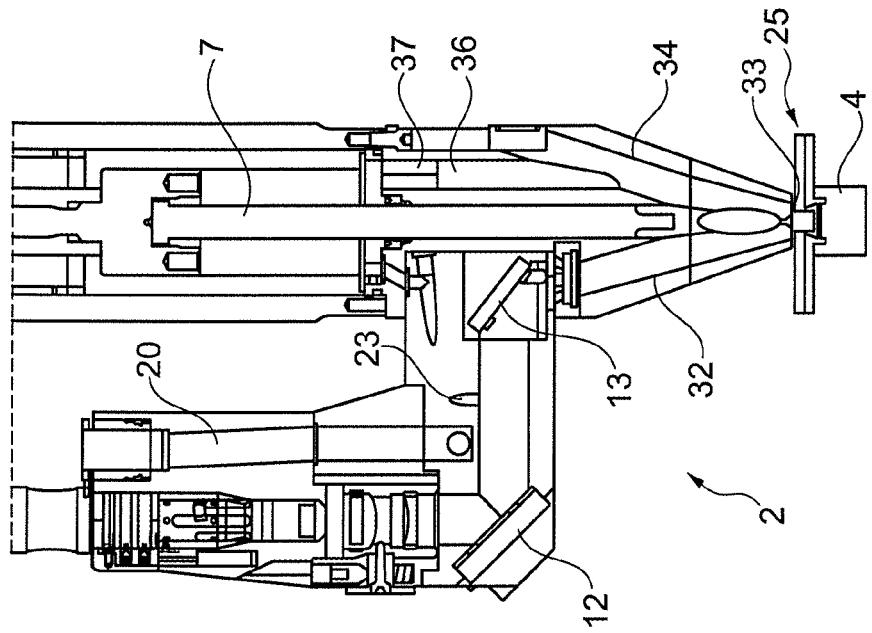
FIG. 8 shows a sectional view of the arrangement according to FIGS. 4, 5 and 7 in the initial position after producing the joint connection.

For example, after the pressure in the flow channel 3 has been checked, the second outlet 37 and/or a valve to the pump of the suction line 20 is opened so that a flow in the flow channel 38 is built up again (see FIG. 5, arrows). The fluid thus flows from the inlet 23 to the second mirror 13, to the protective glass 15, along the first recess 32 to the second recess 34, along the indentation 36 to the second outlet 37, and is suctioned off at the second outlet 37. Thus preferably contamination is removed from the flow channel 38 by the flow in the flow channel 38.

Once the flow is formed in the flow channel 38, the control unit 40 activates the light source 10, wherein the light beam from the collimator 11 strikes the first mirror 12 and is reflected on the first and second mirror 12, 13, so that the light beams along the first indentation 32 strike the workpiece 25 (see FIG. 4, arrows L). For example, the workpiece 25 is heated by the light beams of the light source 10, wherein a portion of the light beams are reflected on the workpiece 25, in particular, when the surface is not yet heated. The reflected light beams pass along the second recess 34 to the radiation trap 14 or radiation sump by the hold-down device 6 being positioned perpendicularly to the workpiece 25. As a result, protection against radiation is ensured without an additional radiation protection cabin.

Figure 6:
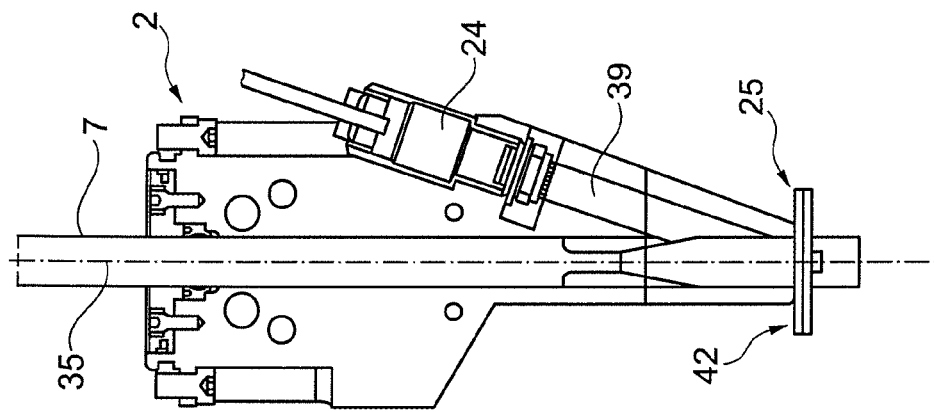
FIG. 6 shows a sectional view of a part of the joining tool unit with the pyrometer.

The temperature on the workpiece is preferably measured by the pyrometer 24 (see FIG. 6). The pyrometer 24 is arranged on the hold-down device 6, wherein a bore 39 is configured on the hold-down device 6. Preferably, a longitudinal extent of the bore 39 is oriented transversely to the longitudinal extents of the recesses 32, 34 and to the movement axis 35 of the movable tool 7. Thus the pyrometer 24 does not block the light radiation along the light guiding system 9 or the movement of the movable tool 7. For example, the bore 39 is provided on the hold-down device 6 so as to be rotated relative to the first recess 32 by 90° about the movement axis 35. As a result, a heat radiation of the workpiece can reach the pyrometer 24 via the bore 39, whereby a temperature of the workpiece 25 can be determined, in particular, a temperature of the workpiece 25 at the joint location of the workpiece. The pyrometer 24 preferably communicates the measured temperature to the control unit 40, wherein the temperature to be reached is stored in the control unit 40 and compared with the measured value. The control unit 40, for example, has stored the temperatures to be reached for the different materials. If the temperature to be reached, for example, is not attained before a specific time period, the light source 10 is deactivated. If the temperature to be reached cannot be attained in the specific time period, the joining process is initially interrupted.

Figure 7:
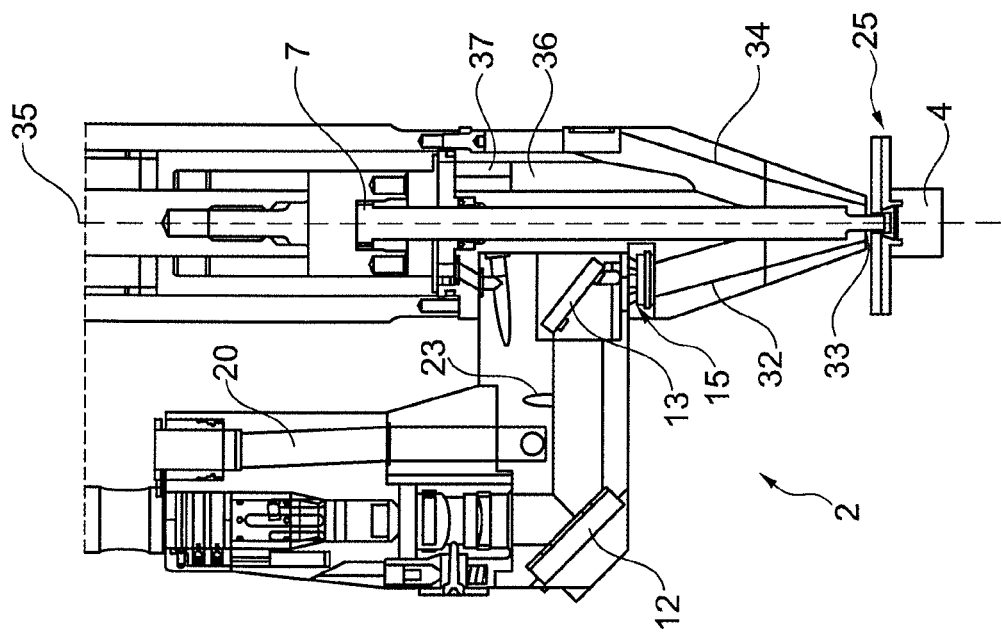
FIG. 7 shows a sectional view of the arrangement according to FIGS. 4 and 5, wherein the joint connection is produced.

For example, a movement of the movable tool 7 is started in the direction of the tool counter element 4, in particular, immediately before the light source 10 is switched off or at the same time as the light source 10 is switched off or after the light source 10 is switched off, so that the workpiece 25 is joined at the joint location (see FIG. 7). For example, the control unit 40 is configured to check whether the light source 10 and thus an illumination of the workpiece 25 is switched off when the movable tool 7 reaches a region of the radiation path of the light beams of the light source 10 on its path in the direction of the tool counter element 4. As a result, the movable tool 7 is prevented from being undesirably heated up by irradiation with the light beams of the light source 10. A safety of an operator on the joining tool unit 2 is also to be ensured thereby. It is also conceivable, however, that the control unit initially checks whether the light source 10 and thus an illumination of the workpiece 25 is switched off, and activates a movement of the movable tool 7 only after checking whether the light source 10 is switched off. The movable tool 7 is preferably moved along the movement axis 35 toward the workpiece 25, wherein the two workpiece parts of the workpiece 25 are deformed by the contact of the movable tool 7 with the first workpiece part of the workpiece 25, preferably by the workpiece parts of the workpiece 25 being pushed against the tool counter element 4. A joint connection is produced thereby. For example, during the production of the joint connection, in particular, a flow is permanently present in the flow channel 38 so that contamination which is generated when producing the joint connection can be transported away (see FIG. 5).

For example, after the joining process is terminated, the movable tool 7 is moved back into an initial position according to FIG. 4. For example, then the second outlet 37 is closed. For example, then the joining tool unit 2, in particular, the hold-down device 6, is moved by the drive 8 away from the workpiece 25. For example, fluid flows permanently through the inlet 23 in the direction of the first outlet 33 so that the optics are not contaminated, even during downtime.

LIST OF REFERENCE SIGNS

1 Tool gripper
2 Joining tool unit
3 Tool clip
4 Tool counter element
5 Connecting element
6 Hold-down device
7 Tool
8 Drive
9 Light guiding system
10 Light source
11 Collimator
12 Mirror
13 Mirror
14 Radiation sump
15 Protective glass
16 Socket
17 Socket
18 Socket
19 Socket
20 Suction line
21 Socket
22 Socket
23 Inlet
24 Pyrometer
25 Workpiece
26 Adjusting element
27 Fastening element
28 Safety switch
29 Attachment element
30 Fastening mechanism
31 Cooling plate
32 Recess
33 Outlet
34 Recess
35 Movement axis
36 Indentation 37 Outlet
38 Flow channel
39 Bore
40 Control unit
41 Region
42 Tool surface

The invention claimed is:

1. A joining tool unit comprising a hold-down device with a movable tool and a tool counter element, wherein the hold-down device together with the movable tool and the tool counter element are provided opposite each other, wherein a workpiece can be positioned between the hold-down device and the tool counter element in an arranged state, wherein the movable tool and the tool counter element cooperate to form a joint connection by the moveable tool pushing against the workpiece and the tool counter element to deform the workpiece to form the joint connection, wherein a light guiding system is formed on the hold-down device, wherein the light guiding system is designed to conduct a light beam of a light in a direction of a joint location of the workpiece when the workpiece is arranged on the joining tool unit, wherein a flow channel for a fluid is defined along a section of the light beam of the light to a workpiece-side end of the hold-down device, wherein the flow channel has an inlet and a first outlet, wherein the first outlet for the fluid is formed on a workpiece-side end of the hold-down device, said outlet being in contact with the workpiece during a joining process, and wherein a second outlet at an end of an indentation of the flow channel and connected to a suction line in the hold-down device is provided, and wherein the movable tool is provided to be movable along a movement axis of the joining tool unit.

2. The joining tool unit as claimed in claim 1, wherein the movable tool is provided to be movable only in a linear manner along the movement axis of the joining tool unit.

3. The joining tool unit as claimed in claim 1, further comprising a sensor on the flow channel.

4. The joining tool unit as claimed in claim 3, wherein a change in pressure can be measured by the sensor.

5. The joining tool unit as claimed in claim 1, wherein the second outlet can be shut off.

6. The joining tool unit as claimed in claim 1, wherein the light guiding system comprises optics, wherein the fluid can be conducted through the flow channel such that the fluid cools and cleans the optics.

7. The joining tool unit as claimed in claim 3, wherein the joining tool unit comprises a control unit, wherein the control unit can detect the data of the sensor.

8. The joining tool unit as claimed in claim 1, wherein a predetermined threshold value can be exceeded when the first outlet is covered and the second outlet is blocked.

9. The joining tool unit as claimed in claim 3, wherein a control unit activates the light beam when the sensor exceeds a predetermined threshold value for a pressure.

10. The joining tool unit as claimed in claim 3, wherein a control unit deactivates or does not release the light beam when the sensor falls below a predetermined threshold value for a pressure.

11. A tool gripper comprising a joining tool unit as claimed in claim 1 and further comprising a tool clip.

12. A joining process of a workpiece by a joining tool unit as claimed in claim 3, having the method steps, as follows:
introducing a fluid into the flow channel,
moving the joining tool unit in a direction of a workpiece until the first outlet of the hold-down device is positioned on the workpiece,
blocking the second outlet of the hold-down device,
measuring a pressure by means of the sensor in the flow channel,
comparing the pressure measured by the sensor with a predeterminable threshold value for the pressure by means of a control unit,
opening the second outlet and producing a flow in the flow channel when the predetermined threshold value is exceeded by the pressure measured by the sensor,
activating a light source by means of the control unit for irradiation of the joint location of the workpiece,
terminating the irradiation of the joint location of the workpiece at the same time as the start of the movement of the movable tool of the joining tool unit in the direction of the workpiece, or after the start of the movement of the movable tool of the joining tool unit in the direction of the workpiece,
shutting off the second outlet by means of the control unit,
moving the joining tool unit or the hold-down device away from the workpiece.

* * * * *